US012783165B2

(12) United States Patent
Ravichandrasekaran et al.

(10) Patent No.: US 12,783,165 B2
(45) Date of Patent: Nov. 3, 2026

(54) EFFICIENT INTER-PROCESS BROADCAST IN A DISTRIBUTED SYSTEM

(71) Applicant: Hewlett Packard Enterprise Development LP, Spring, TX (US)

(72) Inventors: Naveen Namashivayam Ravichandrasekaran, Saint Paul, MN (US); Nathan L. Wichmann, Plymouth, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 397 days.

(21) Appl. No.: 18/524,707

(22) Filed: Nov. 30, 2023

(65) Prior Publication Data

US 2025/0181268 A1 Jun. 5, 2025

(51) Int. Cl.
*G06F 9/44* (2018.01)
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G06F 9/542; G06F 9/544
USPC .......................................................... 718/102
See application file for complete search history.

(56) References Cited

U.S. PATENT DOCUMENTS

| | | | | | |
|---|---|---|---|---|---|
| 8,325,633 | B2 * | 12/2012 | Archer | G06F 13/28 | 370/282 |
| 2011/0113083 | A1 * | 5/2011 | Shahar | G06F 15/17393 | 709/201 |
| 2017/0195212 | A1 * | 7/2017 | Chen | G06F 3/0655 | |

OTHER PUBLICATIONS

"Aurora_Argonne Leadership Computing Facility", available online at <https://www.alcf.anl.gov/aurora>, 2023, 16 pages.
"Front Page—LUMI", available online at <https://web.archive.org/web/20200604000446/https://www.lumi-supercomputer.eu/>, Jun. 4, 2020, 3 pages.
"Frontier supercomputer", available online at <https://web.archive.org/web/20210321105527/https://www.olcf.ornl.gov/frontier/>, Mar. 21, 2021, 8 pages.
ISO/IEC 1539-1:2018 Information technology—Programming languages—Fortran—Part 1: Base language, available online at <https://web.archive.org/web/20200923203256/https://www.iso.org/standard/72320.html>, Sep. 23, 2020, 4 pages.

(Continued)

*Primary Examiner* — Timothy A Mudrick
(74) *Attorney, Agent, or Firm* — Yao Legal Services, Inc.

(57) ABSTRACT

A system for performing a broadcast operation on a first process in a plurality of processes is provided. During operation, the system can select, from the plurality of processes, a subset of processes based on a plurality of selection conditions. The system can initiate a broadcast operation for the subset of processes and identify a source buffer of a root process storing data to be distributed by the broadcast operation. The system can then determine a first segment of the data for which the first process is responsible for broadcasting based on a number of processes in the subset of processes. The system can obtain the first segment from the source buffer based on remote memory access and store the first segment in a first destination buffer of the first process. The system can send the first segment to respective destination buffers of other processes in the subset of processes.

20 Claims, 13 Drawing Sheets

(56) References Cited

OTHER PUBLICATIONS

"MPI Documents", available online at <https://web.archive.org/web/20030130150518/http://www.mpi-forum.org/docs/>, Jan. 30, 2003, 1 page.
"NVIDIA Collective Communications Library (NCCL)", available online at <https://web.archive.org/web/20190322034404/https://developer.nvidia.com/nccl>, Mar. 24, 2019, 3 pages.
OpenSHMEM, available online at <https://web.archive.org/web/20200224123342/http://www.openshmem.org/site/>, Feb. 24, 2020, 1page.
"The Linpack Benchmark", available online at <https://www.top500.org/project/linpack/>, 1993, 1 page.
"The UPC Language", available online at <https://upc.lbl.gov/>, Oct. 28, 2022, 4 pages.
AMD, "AMD Infinity Architecture", available online at <https://www.amd.com/en/technologies/infinity-architecture>, 2024, 11 pages.
Dr. Ian Cutress, "Analyzing Intel's Discrete Xe-HPC Graph . . . ", available online at <https://www.anandtech.com/show/15188/analyzing-intels-discrete-xe-hpc-graphics-disclosure-ponte-vecchio/5>, Dec. 24, 2019, 8 pages.
Github, "Cray OpenSHMEMX", available online at <https://cray-openshmemx.readthedocs.io/en/latest/>, 2023, 5 pages.
Github, "DeepSpeed", available online at <https://web.archive.org/web/20210331043642/https://www.deepspeed.ai/>, Mar. 31, 2021, 14 pages.
HPE, "HPE Cray Programming Environment 23.12", available online at <https://web.archive.org/web/20231124090154/https://cpe.ext.hpe.com/docs/index.html>, Nov. 24, 2023, 6 pages.
Microsoft, "DeepSpeed ZeRO++: A leap in speed for LLM and chat model training with 4X less communication", available online at <https://www.microsoft.com/en-us/research/blog/deepspeed-zero-a-leap-in-speed-for-llm-and-chat-model-training-with-4x-less-communication/>, Jun. 22, 2023, 12 pages.
NERSC , "Perlmutter Architecture", available online at <https://web.archive.org/web/20220930203106/https://docs.nersc.gov/systems/perlmutter/architecture/>, Sep. 30, 2022, 8 pages.
Nuriyev et al., "Model-based selection of optimal MPI broadcast algorithms for multi-core clusters", Journal of Parallel and Distributed Computing, Jul. 2022, 16 pages.
Nvidia, "NVLink & NVSwitch_Advanced Multi-GPU Systems", available online at <https://web.archive.org/web/20210225024015/https://www.nvidia.com/en-us/data-center/nvlink/>, Feb. 25, 2021, 7 pages.
OPENMP, "Specifications", available online at <https://www.openmp.org/specifications/>, 2023, 5 pages.
Wikipedia, "El Capitan (supercomputer)", available online at <https://en.wikipedia.org/w/index.php?title=El_Capitan_(supercomputer)&oldid=1139046253>, Feb. 13, 2023, 2 pages.

* cited by examiner

EFFICIENT INTER-PROCESS BROADCAST IN A DISTRIBUTED SYSTEM

BACKGROUND

Field

High-performance computing (HPC) can often facilitate efficient computation on the nodes running an application. HPC can facilitate high-speed data transfer between sender and receiver devices.

BRIEF DESCRIPTION OF THE FIGURES

In the figures, like reference numerals refer to the same figure elements.

DETAILED DESCRIPTION

Figure 1A:
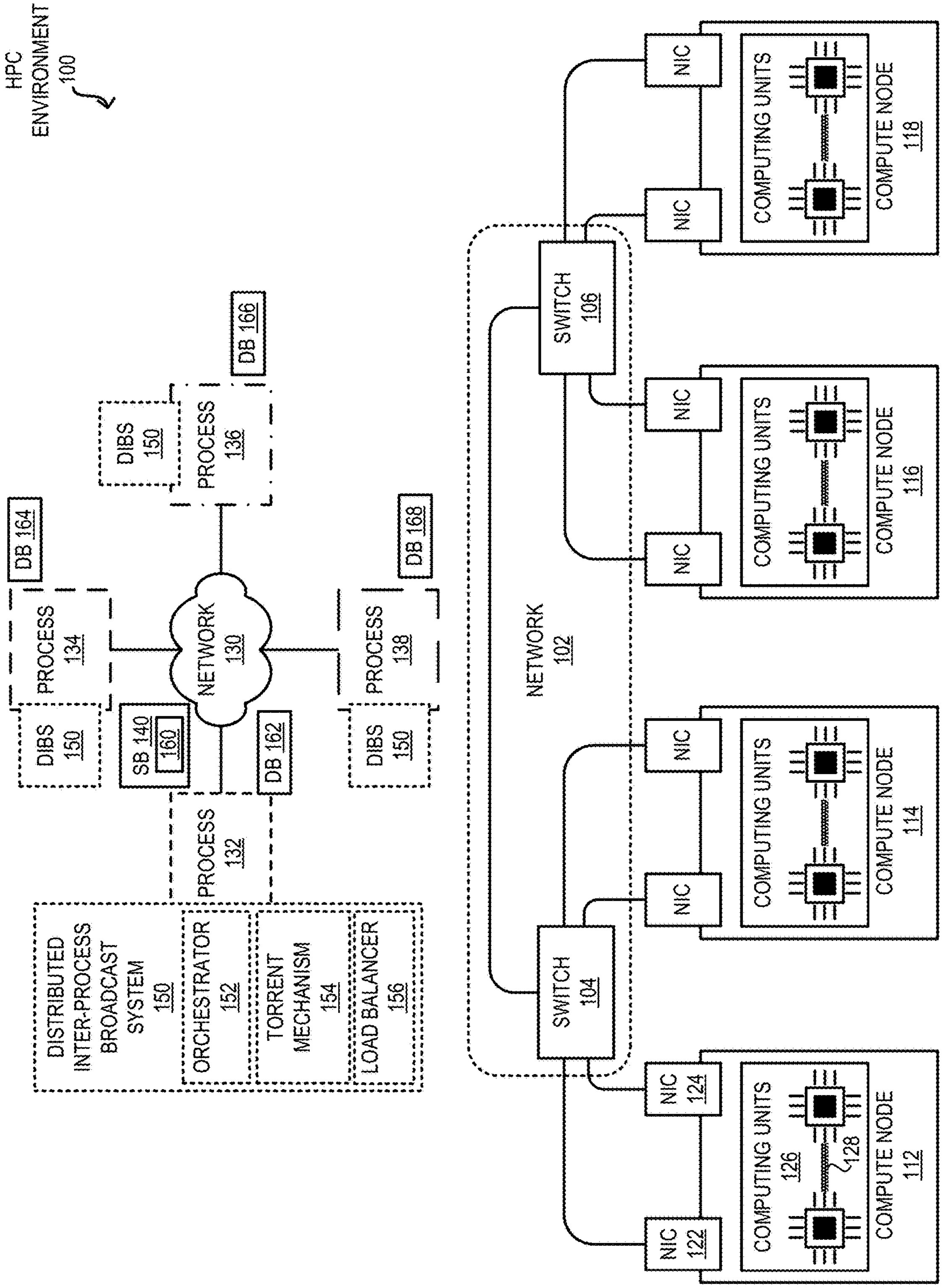
FIG. 1A illustrates an example of a distributed system supporting efficient inter-process broadcast, in accordance with an aspect of the present application.

As applications become progressively more distributed, HPC can facilitate efficient computation on the nodes running an application. An HPC environment can include compute nodes (e.g., computing systems, such as server blades), storage nodes, and high-capacity network devices coupling the nodes and forming a distributed system. Hence, the HPC environment can include a high-bandwidth and low-latency network formed by the network devices. The compute nodes can be coupled to the storage nodes via a network. The compute nodes may run one or more application processes (or processes) in parallel. The storage nodes can record the output of computations performed on the compute nodes. In addition, data from one compute node can be used by another compute node for computations. Therefore, the compute and storage nodes can operate in conjunction with each other to facilitate high-performance computing.

One or more processes can perform computations on computing units, such as processor cores and accelerators, of a compute node. The data generated by the computations can be transferred to another node using a network interface controller (NIC) of the compute node. Such transfers may include a remote direct memory access (RDMA) operation. One such communication can be broadcast, which is a collective communication operation performed by a plurality of processes in conjunction with each other. The broadcast can include a source process, which can also be referred to as a root process, that transfers the local buffer (e.g., the source buffer) to respective destination buffers of all target processes participating in the collective operation. The broadcast operation can also include transferring the source buffer to a destination buffer of the root process.

The aspects described herein address the problem of efficiently broadcasting data among a plurality of processes executing on a distributed system by (i) dividing the processes into subgroups based on the underlying physical architecture of the distributed system; (ii) for each subgroup, providing a respective segment of the data to a corresponding process; and (iii) performing a broadcast operation on the segment from the corresponding process. Here, the distributed system can include one or more compute nodes, each comprising a plurality of computing units and NICs. Distributing different segments of the data from different processes can form a torrent-like distributed broadcast operation. By utilizing the architecture of the distributed system and distributing respective segments of the data from different processes, the broadcast operation can efficiently provide the data to the plurality of processes.

Typically, a set of processes in an HPC environment can perform a broadcast operation to distribute data among the processes. A respective process can execute on a computing unit of a distributed system. The set of processes can perform a collective computation in conjunction with each other (e.g., by utilizing parallelism). For example, if the processes perform a single program, multiple data (SPMD) computation, the processes can perform a broadcast operation to distribute input or global values of the collective computation. Typically, in the HPC environment, a number of compute nodes and a network coupling them can form the distributed system. A respective compute node may include a number of computing units, such as central processing units (CPUs) and graphics processing units (GPUs). A respective process may be executed on one of the computing units. Therefore, the data transfer performed for the broadcast operation can be executed via the interconnect within a compute node or through the network via the NIC of the compute node.

The broadcast operation can include a root process distributing data from a source buffer to the set of processes participating in the collective computation. The source buffer can store the data that is to be distributed by the broadcast operation. A respective process, which includes the root process, can receive the data and store the data in a destination buffer. Existing broadcast topologies, such as ring and tree, can be inefficient for a large volume of broadcast data. For example, the ring topology can be bandwidth-efficient but may incur significant latency. On the other hand, a tree topology can reduce latency but can be bandwidth inefficient. Furthermore, compute nodes typically include multiple computing units. These nodes can also include multiple NICs. Existing broadcast techniques generally do not utilize the architecture of the nodes or the presence of multiple NICs to ensure the efficient distribution of data.

To address this issue, an HPC environment can deploy a distributed inter-process broadcast system (DIBS) that can achieve low latency with high bandwidth efficiency. The DIBS can use a torrent process (or torrent) to perform the broadcast operation where the data in the source buffer is segmented and distributed from different processes. An instance of the DIBS can asynchronously execute on a respective process. The DIBS can include an orchestrator, a torrent mechanism, and a load balancer. The torrent mechanism can deploy the broadcast algorithm. Since an instance of DIBS can execute on a respective process, these instances can operate in conjunction with each other to facilitate the broadcast operation. The SPMD computation associated with the broadcast operation can be defined based on a distributed HPC programming model. Examples of the programming model can include, but are not limited to, Message Passing Interface (MPI), Open Shared Memory (OpenSHMEM), NVIDIA Collective Communication Library (NCCL), Unified Parallel C (UPC), and Coarray Fortran.

During operation, the orchestrator of the DIBS can determine a subgroup (or subset) of the processes that can participate in a torrent based on a set of selection conditions associated with the architecture of the distributed system. In particular, subgroups can be formed based on the location of the computing unit executing a process. Accordingly, the selection conditions can include one or more of the following: the location of the computing unit with respect to the root process, affinity (or closeness) to the NICs within a compute node, and distribution of processes on individual compute nodes. The affinity can be represented by the accessibility to the NIC. The computing unit that is physically closest to the NIC can have the most accessibility. Therefore, the process running on the computing unit can also have the most accessibility among all processes. Here, the compute node executing the root process can be referred to as the root node. Hence, the rest of the compute nodes can be referred to as non-root compute nodes. Based on the selection conditions, the orchestrator can generate a hierarchy of processes.

For example, the processes running on the same compute node as the root process can belong to a root subgroup. Furthermore, the computing units that have an affinity to the NICs (e.g., are closest to the NICs) within a compute node can transfer data with low latency via the interconnect within a compute node and, hence, efficiently transfer data via the NICs. Hence, the processes running on the computing units with affinity to the NICs can belong to an inter-node subgroup. Each of these processes can be referred to as a primary process or a secondary root process of corresponding nodes. The rest of the processes can be in a non-root subgroup. The subgroups can have inter-dependency among them. For example, a primary process of a non-root compute node can obtain the data prior to distributing it to the processes in the non-root subgroup.

Based on the inter-dependency, the orchestrator can determine which subgroup should initiate a torrent of the broadcast operation. When a torrent is initiated for a subgroup, the torrent mechanism on the processes in the subgroup can divide the source buffer into data blocks (or blocks) based on the number of processes. Each process can be responsible for the distribution of a subset of the blocks. Each process can obtain the corresponding block from the source buffer using an RDMA GET command and place it in a corresponding location of the local destination buffer. The process can then distribute the block to the corresponding locations of respective destination buffers of all other processes in the subgroup using an RDMA PUT command.

For example, if there are four processes in a subgroup, the torrent can divide the data into four blocks. Each process can obtain the subset of the blocks from the source buffer and distribute the blocks to the respective destination buffers of all other processes. To distribute the block, the process can randomly select a target process and transfer the block to the destination buffer of the target process. Since the underlying programming model facilitates the allocation of the buffers, a respective process of the collective operation can be aware of the location of a respective buffer.

The orchestrator can select the root subgroup to execute the initial torrent. Because there may not be a dependency between the root subgroup and the inter-node subgroup, a torrent on the inter-node subgroup can be initiated in parallel. If the number of NICs on a compute node is N, there can be N processes of the compute node included in the inter-node subgroup. Therefore, N processes on a respective non-root compute node can receive the data from the root node via the corresponding torrent. Subsequently, these N processes can operate as the primary processes (or secondary root processes) on their corresponding compute node. In the compute node, a respective primary process can select a subset of processes in the non-root subgroup and initiate a torrent to distribute the data. As a result, on a respective compute node, there can be N parallel torrents to distribute the data to the processes of the non-root subgroup. In this way, the DIBS instances of the processes can efficiently broadcast the data.

The load balancer of the DIBS can further enhance the distribution by randomly selecting a target process to send data instead of sequential selection. Such randomization can improve the utilization of the interconnects and the network. In addition, if a large volume of data is to be transferred from the source buffer, individual blocks can also be large. To transfer these large blocks, the load balancer can perform multi-level segmentation where each block can be divided into smaller sub-blocks. Instead of allocating individual blocks, the torrent mechanism can then allocate the sub-blocks to the processes with interleaving. For example, if there are four processes in a torrent, the data can be divided into four blocks. Based on the multi-level segmentation, a respective block can be further divided into four sub-blocks. Every ith sub-block can then be allocated to the ith process. As a result, a respective process can distribute a sub-block of a respective block in an interleaving way using torrent. Sending smaller sub-blocks can reduce contention for resources. Furthermore, when the primary process (or secondary root process) of a compute node receives a sub-block, the primary process can start transferring the sub-block to the processes in the non-root subgroup. Therefore, the load balancer can facilitate pipelining for the sub-blocks among different subgroups of processes to achieve efficient distribution of data.

FIG. 1A illustrates an example of a distributed system supporting efficient inter-process broadcast, in accordance with an aspect of the present application. An HPC environment 100 can include a distributed system comprising compute nodes 112, 114, 116, and 118. A respective compute node can include one or more computing units, such as CPUs and GPUs, and can be equipped with a plurality of NICs. The computing units in a compute node can be coupled to each other via corresponding intra-node interconnects (e.g., CPU interconnects, such as Quick Path and Ultra Path interconnects). The interconnects can connect different components within the compute node. For example, compute node 112 can include a number of computing units 126 coupled to each other via interconnect 128. Compute node 112 can also include NICs 122 and 124. A network 102 can connect compute nodes 112, 114, 116, and 118 to each other via inter-node links.

For example, compute node 112 can be coupled to a switch 104 of network 102 via NICs 122 and 124. Even though NICs 122 and 124 can be coupled to the same network 102, they provide distinct inter-node links that can transfer data simultaneously. Similarly, compute node 114 can be coupled to switch 104, and compute nodes 116 and 118 can be coupled to switch 106 of network 102. In HPC environment 100, a number of processes 132, 134, 136, and 138 can be executed on corresponding computing units. Processes 132, 134, 136, and 138 can communicate with each other via a network 130. If two processes execute on the same compute node, the processes can communicate with each other via an intra-node interconnect. On the other hand, if they execute on different compute nodes, they can communicate with each other via an intra-node interconnect as well as inter-node links. Therefore, network 130 can incorporate network 102 and the intra-node interconnects, such as interconnect 128.

Processes 132, 134, 136, and 138 perform a collective computation in conjunction with each other (e.g., by utilizing parallelism). For example, if processes 132, 134, 136, and 138 perform an SPMD computation, these processes can perform a broadcast operation to distribute input or global values of the collective computation. The broadcast operation can include a root process, which can be process 132. Root process 132 can distribute data 160 from a source buffer 140 to destination buffers 162, 164, 166, and 168 of processes 132, 134, 136, and 138, respectively. Hence, source buffer 140 can store data 160 that is to be distributed by the broadcast operation. Existing broadcast topologies, such as ring and tree, can be inefficient if the volume of data 160 is large. For example, the ring topology can be bandwidth-efficient but may incur significant latency. On the other hand, a tree topology can reduce latency but can be bandwidth inefficient. Furthermore, existing broadcast techniques generally do not utilize the architecture of nodes 112, 114, 116, and 118 or the presence of multiple NICs to ensure the efficient distribution of data 160.

To address this issue, HPC environment 100 can deploy DIBS 150, which can achieve low latency with high bandwidth efficiency. DIBS 150 can use torrents to perform the broadcast operation where data 160 is segmented and distributed from different processes. The unit of data distributed in a torrent can be referred to as a segment. An instance of DIBS 150 can asynchronously execute on a respective process. DIBS 150 can include an orchestrator 152, a torrent mechanism 154, and a load balancer 156. Torrent mechanism 154 can deploy the broadcast algorithm. Since an instance of DIBS 150 can execute on a respective process, these instances can operate in conjunction with each other to facilitate the broadcast operation in HPC environment 100. The SPMD computation associated with the broadcast operation can be defined based on a distributed HPC programming model supported by HPC environment 100. Examples of the programming model can include, but are not limited to, MPI, OpenSHMEM, NCCL, UPC, and Coarray Fortran.

Orchestrator 152 can be aware of the topology and architecture of the distributed system. Accordingly, orchestrator 152 can allocate a respective process to a subgroup (or subset) of processes. For example, on compute node 112, orchestrator 152 can determine which computing units have affinity to NICs 122 and 124, and allocate the processes running on these computing units to the inter-node subgroup. The affinity can be represented by the accessibility to NICs 122 and 124. The computing units that are physically closest to NICs 122 and 124 can have the most accessibility. Therefore, the process running on the computing unit can also have the most accessibility among all processes. Similarly, based on the execution of root process 132, orchestrator 152 can determine which processes belong to the root subgroup. Orchestrator 152 can also initiate the execution of torrent mechanism 154 for corresponding subgroups.

Furthermore, load balancer 156 can support different techniques, such as multi-level segmentation and pipelining, to enhance the broadcast operation. To transfer these large blocks, load balancer 156 can perform multi-level segmentation where each block can be divided into smaller sub-blocks. Instead of allocating individual blocks, the torrent mechanism can then allocate the sub-blocks to processes 131, 134, 136, and 138 with interleaving. In this example, since there are four processes, data 160 can be divided into four blocks. Based on the multi-level segmentation, a respective block can be further divided into four sub-blocks. Every ith sub-block can then be allocated to the ith process. As a result, a respective process can distribute a sub-block of a respective block in an interleaving way using torrent. Sending smaller sub-blocks can reduce contention for resources. Therefore, load balancer 156 can facilitate pipelining for the sub-blocks among different subgroups of processes to achieve efficient distribution of data.

Torrent mechanism 154 can implement the torrent broadcast algorithm to efficiently broadcast data 160 from buffer 140 amongst processes 132, 134, 136, and 138. Torrent mechanism 154 can be agnostic to the topology of network 102 or the distribution of processes 132, 134, 136, and 138 on computing units. Therefore, torrent mechanism 154 may consider network 130 a "black box." In this example, torrent mechanism 154 can divide buffer 140 into four blocks and allocate a block to each of processes 132, 134, 136, and 138. A respective process can then retrieve the allocated block to its local destination buffer. The process can then distribute the block to all other processes. To distribute the block, the process can randomly select a target process and transfer the block to the destination buffer of the target process (e.g., using RDMA PUT). The selection and transfer operations are repeated until all processes receive the block.

Figure 1B:
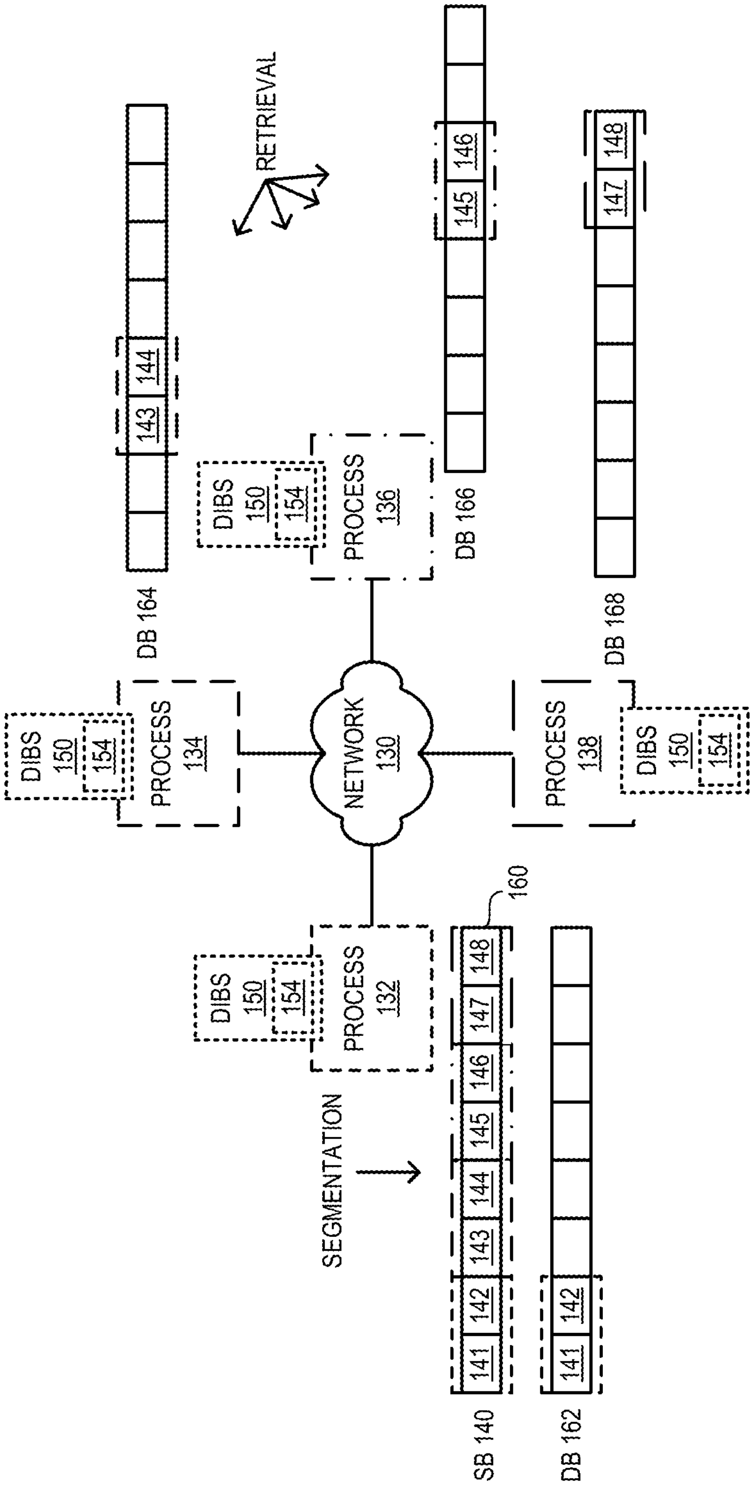
FIG. 1B illustrates an example of segmenting data for a distributed inter-process broadcast operation, in accordance with an aspect of the present application.

FIG. 1B illustrates an example of segmenting data for a distributed inter-process broadcast operation, in accordance with an aspect of the present application. Torrent mechanism 154 of DIBS 150 can facilitate a torrent broadcast algorithm. The algorithm can include three steps-segmentation, retrieval, and distribution. Based on the broadcast operation semantics of the underlying programming model, processes 132, 134, 136, and 138 can identify process 132 as the root process and determine the total volume (or size) of data 160 in buffer 140 that is to be broadcast. Data 160 can include a number of blocks 141, 142, 143, 144, 145, 146, 147, and 148. A respective block can be identified by a corresponding index. Because a block can be distributed via a torrent, in this example, a block of data 160 can be the segment on which the broadcast operation is being performed.

During the segmentation step, each of processes 132, 134, 136, and 138 can independently (i.e., without the involvement of other processes) determine which blocks of data 160 the process is responsible for distributing. Segmentation can be a local operation. Torrent mechanism 154 can divide the number of blocks in data 160 by the number of processes to determine how many blocks each process is responsible for distributing. In this example, the number of processes can be four, and the number of blocks can be eight. Hence, a respective process can be responsible for distributing two blocks. Torrent mechanism 154 can then determine the index of the local process based on the respective process identifiers. Here, the indices for processes 132, 134, 136, and 138 can be 0, 1, 2, and 3.

Based on the index of the local process and the number of processes, torrent mechanism 154 of a process can independently identify the blocks it is responsible for distributing. Since there are four processes and eight blocks, each index of a process can correspond to two blocks. Accordingly, process 132 can determine that it is responsible for distributing blocks 141 and 142. Similarly, process 134 can be responsible for blocks 143 and 144, process 136 can be responsible for blocks 145 and 146, and process 138 can be responsible for blocks 147 and 148. Torrent mechanism 154 can ensure that the destination buffer is available for the local process to store the blocks. As a result, when the segmentation step is complete, torrent mechanism 154 of a respective process can initiate the retrieval step.

In the retrieval step, a respective process, using the local instance of torrent mechanism 154, can retrieve the corresponding blocks from buffer 140. The retrieval of the block can be based on an RDMA GET command. Subsequently, the source process can place the blocks in a corresponding location of the local destination buffer. For example, process 132 can obtain blocks 141 and 142 from buffer 140 and store them in the corresponding locations in destination buffer 162. Process 134 can obtain blocks 143 and 144 from buffer 140 and store them in destination buffer 164. Similarly, process 136 can obtain blocks 145 and 146 from buffer 140 and store them in destination buffer 166. Furthermore, process 138 can obtain blocks 147 and 148 from buffer 140 and store them in destination buffer 168. The retrieval step can be performed by the respective instances of torrent mechanism 154.

Figure 1C:
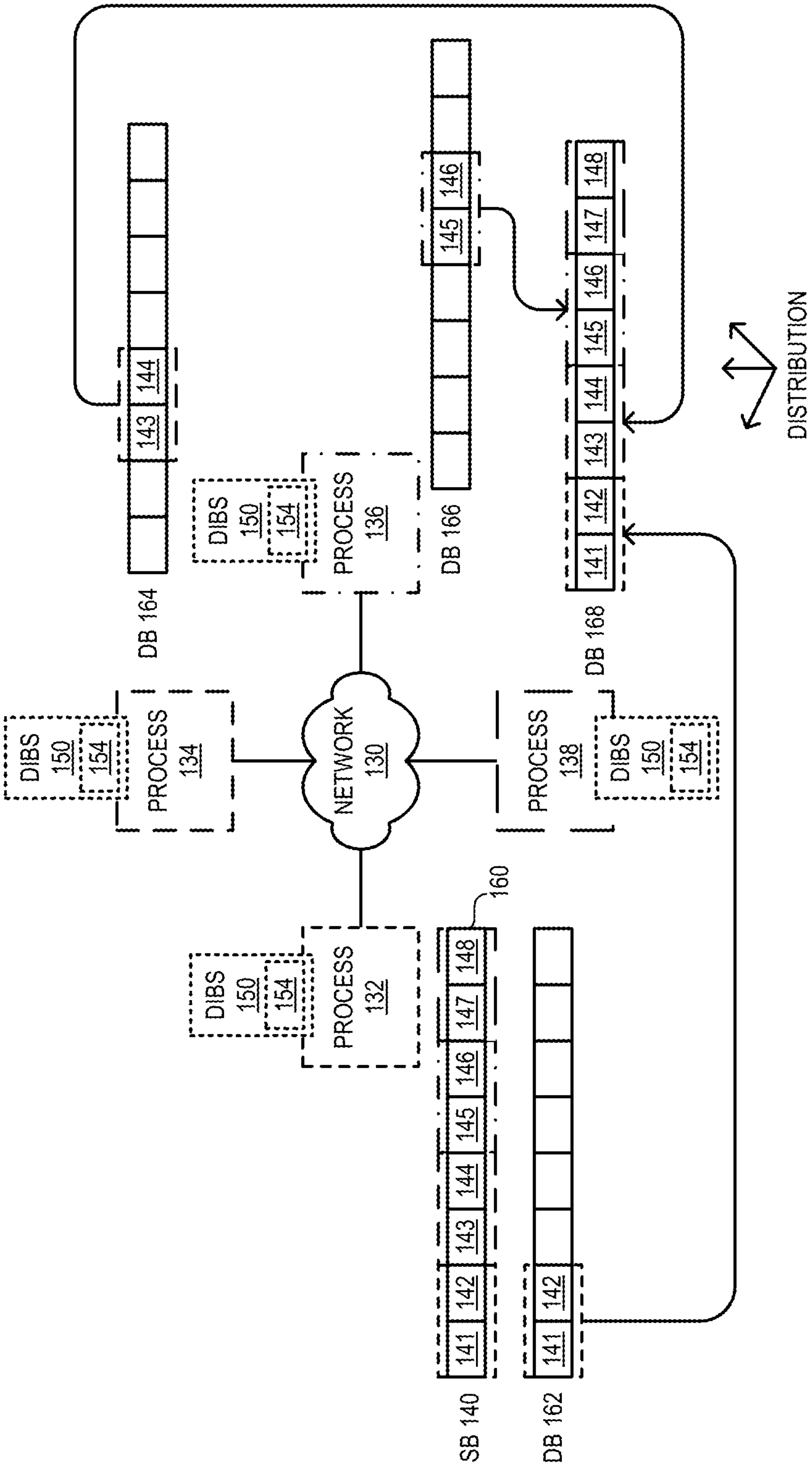
FIG. 1C illustrates an example of performing a distributed inter-process broadcast operation on segmented data, in accordance with an aspect of the present application.

FIG. 1C illustrates an example of performing a distributed inter-process broadcast operation on segmented data, in accordance with an aspect of the present application. Upon completion of the retrieval step, torrent mechanism 154 of a respective process can perform the distribution step. The distribution step can be asynchronously performed by processes 132, 134, 136, and 138. Therefore, once a process receives the blocks allocated to the process, it may start executing the distribution step. In the example in FIG. 1C, once blocks 141 and 142 are placed in destination buffer 162, process 132 can transfer blocks 141 and 142 to a respective other destination buffer, such as buffer 168 of process 138. Process 132 can transfer blocks 141 and 142 to buffer 168 using RDMA PUT. Similarly, process 134 can transfer blocks 143 and 144 from buffer 164 to buffer 168, and process 136 can transfer blocks 145 and 146 from buffer 166 to buffer 168.

While processes 132, 134, and 136 are transferring data into process 138, process 138 can concurrently transfer blocks 147 and 148 to processes 132, 134, and 136 using RDMA PUT. Once process 138 completes transferring its data to processes 132, 134, and 136, process 138 can signal processes 132, 134, and 136 indicating the completion of transferring its blocks 147 and 148 to destination buffers 162, 164, and 166, respectively. At this point, process 138 can wait for the signals from processes 132, 134, and 136. These signals can indicate that the distribution of data 160 is complete for process 138. Based on the signals, process 138 can determine the arrival of data 160 in its entirety.

Figure 1D:
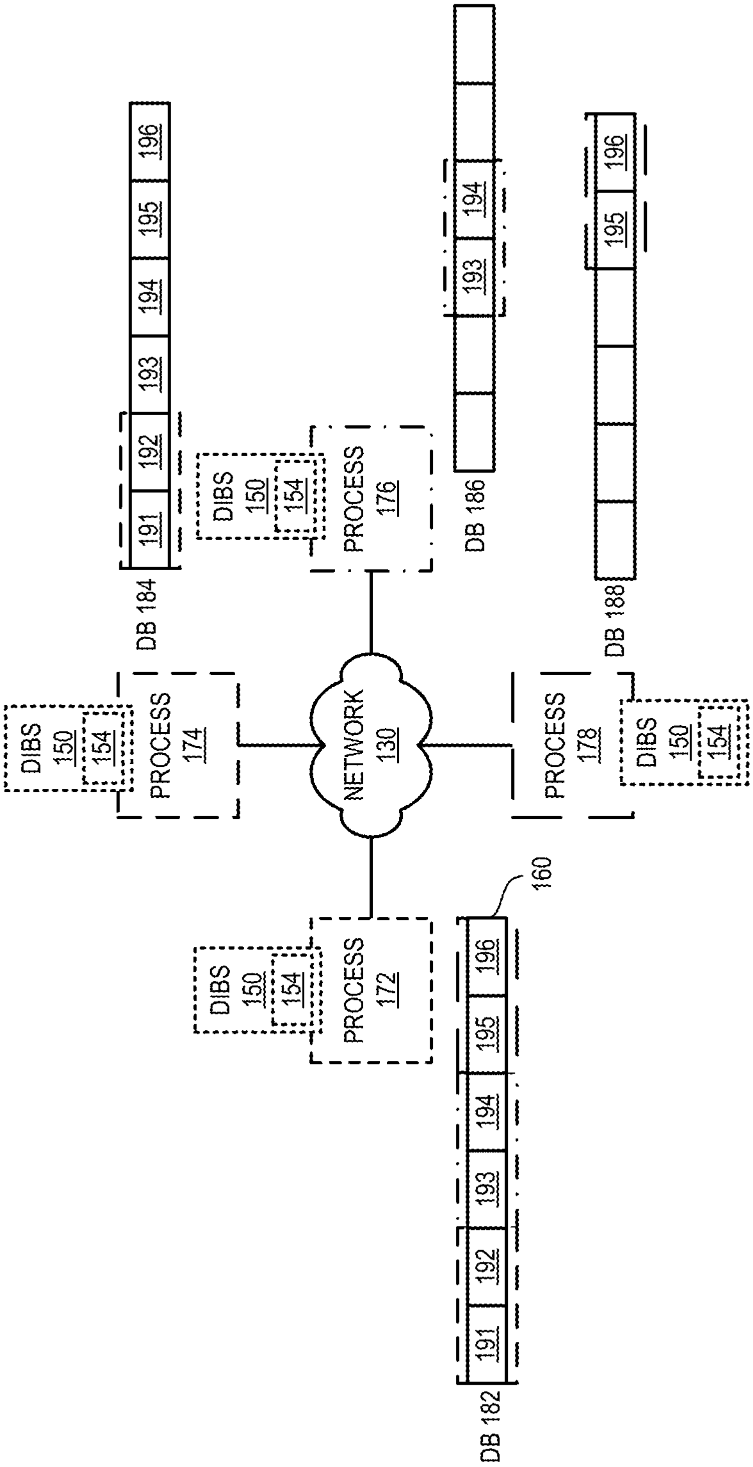
FIG. 1D illustrates an example of performing a non-root distributed inter-process broadcast operation on segmented data, in accordance with an aspect of the present application.

FIG. 1D illustrates an example of performing a non-root distributed inter-process broadcast operation on segmented data, in accordance with an aspect of the present application. Suppose that data 160 is transferred to a destination buffer 182 of process 172. Once data 160 is transferred to buffer 182, process 172 does not need to participate in the subsequent distribution of data 160. In particular, data 160 can be transferred from process 172 to other processes 174, 176, and 178 that rely on process 172 to distribute data. Here, process 172 can operate as the source process for the corresponding torrent. Therefore, buffer 182 can be the secondary source buffer for the torrent that distributes data 160 from buffer 182.

Here, the torrent may not consider process 172 as a participant even though data 160 can be retrieved from buffer 182. In other words, process 172 is not involved in the torrent. Hence, the torrent can be referred to as a non-root torrent where the source process does not participate in the distribution of data. For the non-root torrent, data 160 can be divided into a number of blocks 191, 192, 193, 194, 195, and 196. The number of blocks of data 160 can be determined in such a way that data 160 can be equally distributed among the processes in the torrent.

During the segmentation step, each of processes 174, 176, and 178 can independently determine which blocks of data 160 the process is responsible for distributing. Torrent mechanism 154 can divide the number of blocks in data 160 by the number of processes to determine how many blocks each process is responsible for distributing. In this example, the number of processes is three and the number of blocks is six. Hence, a respective process can be responsible for distributing two blocks. Torrent mechanism 154 can then determine the index of the local process based on the respective process identifiers. Here, the indices for processes 174, 176, and 178 can be 0, 1, and 2. Based on the index of the local process and the number of processes, torrent mechanism 154 of a process can independently identify the blocks it is responsible for distributing. Accordingly, process 174 can be responsible for blocks 191 and 192, process 176 can be responsible for blocks 193 and 194, and process 178 can be responsible for blocks 195 and 196.

In the retrieval step, a respective process, using the local instance of torrent mechanism 154, can retrieve the corresponding blocks from buffer 182. The retrieval of the block can be based on an RDMA GET command. Subsequently, the source process can place the blocks in a corresponding location of the local destination buffer. For example, process 194 can obtain blocks 191 and 192 from buffer 182, and store them in the corresponding locations in destination buffer 184. Process 176 can obtain blocks 193 and 194 from buffer 182, and store them in destination buffer 186. Furthermore, process 178 can obtain blocks 195 and 196 from buffer 182, and store them in destination buffer 188. The retrieval step can be performed by the respective instances of torrent mechanism 154. Even though process 172 is not actively involved in the data movement operation, process 172 can wait for the arrival of the signals from processes 174, 176, and 178 to ensure the completion of the broadcast operation.

Figure 2A:
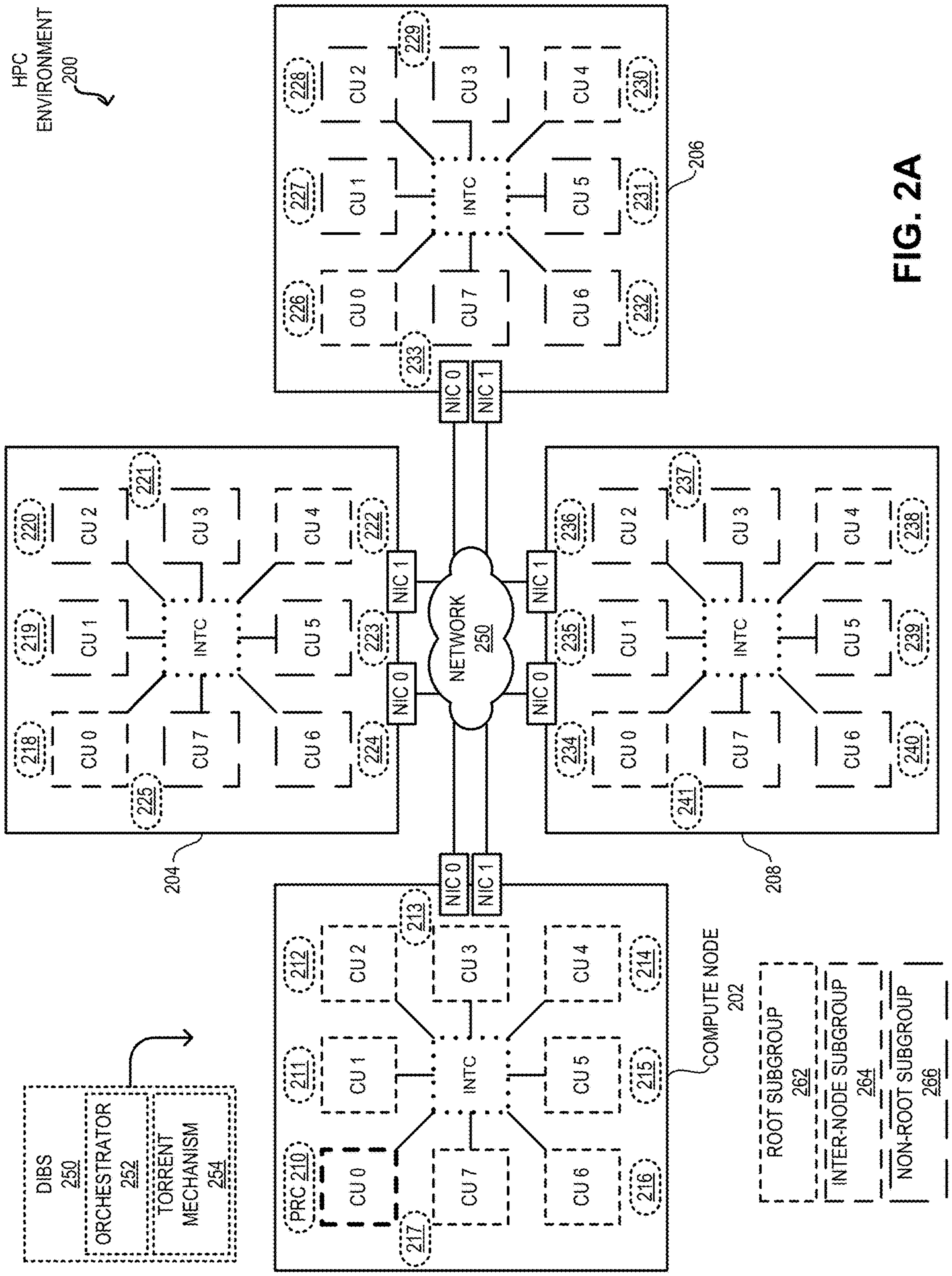
FIG. 2A illustrates an example of subgroups of processes executing on computing units of a distributed system, in accordance with an aspect of the present application.

FIG. 2A illustrates an example of subgroups of processes executing on computing units of a distributed system, in accordance with an aspect of the present application. In this example, HPC environment 200 can include a number of compute nodes 202, 204, 206, and 208 connected through a network 250. A respective compute node can include at least two NICs (e.g., NIC 0 and NIC 1). Each compute node can include a number of computing units, such as computing units 0, 1, 2, 3, 4, 5, 6, and 7. Processes 210, 211, 212, 213, 214, 215, 216, and 217 can execute on respective computing units of compute node 202. Processes 218, 219, 220, 221, 222, 223, 224, and 225 can execute on respective computing units of compute node 204. Furthermore, processes 226, 227, 228, 229, 230, 231, 232, and 233 can execute on respective computing units of compute node 206. Moreover, processes 234, 235, 236, 237, 238, 239, 240, and 241 can execute on respective computing units of compute node 208. Here, process 210 can be the root process.

An instance of DIBS 250 can operate on a respective process of HPC environment 200. During operation, orchestrator 252 of DIBS 250 can determine a subgroup of the processes that can participate in a torrent based on a set of selection conditions associated with the architecture of HPC environment 200. In particular, the subgroups can be formed based on the location of computing units executing the processes. Accordingly, the selection conditions can include one or more of: the location of the computing unit with respect to root process 210, affinity to the NICs within a compute node, and distribution of processes on individual compute nodes. For example, since computing unit 0 of node 202 executes root process 210 (denoted with increased line weight), compute node 202 can be the root node. Based on the selection conditions, orchestrator 252 can generate a hierarchy of processes.

For example, processes 211, 212, 213, 214, 215, 216, and 217 can belong to a root subgroup 262. These processes can participate in the same torrent to receive the data from root process 210. Process 210 can participate in the torrent so that the destination buffer of process 210 also receives a copy of the data. Orchestrator 252 can also identify the computing units that have affinity to the NICs (e.g., are closest to the NICs) within a compute node. Orchestrator 252 can determine that computing units 0 and 4 on a respective compute node have an affinity with NICs 0 and 1, respectively, of the compute node. Hence, orchestrator 252 can place processes 218 and 222 of compute node 204, processes 226 and 230 of compute node 206, and processes 234 and 238 of compute node 208 in an inter-node subgroup 264. These processes can be referred to as the primary processes or secondary root processes of corresponding nodes. For example, processes 218 and 222 can be the primary processes of compute node 204. The rest of the processes can be in a non-root subgroup 266.

Subgroups 262, 264, and 266 can have inter-dependency among them. For example, since the data is available at process 210, a torrent is executed in root subgroup 262. Subsequently, process 218 can receive the data from process 210 via a torrent in inter-node subgroup 264. Because process 210 receives the data from the torrent in root subgroup 262, the torrent can be an inter-node non-root torrent. Subsequently, processes 219, 220, and 221 can retrieve the data from process 218 via a torrent in non-root subgroup 266. Since processes 219, 220, and 221 can execute within compute node 204, the torrent can be an intra-node non-root torrent. Based on the inter-dependency, orchestrator 252 can determine which subgroup should initiate a torrent of the broadcast operation. When a torrent is initiated for a subgroup, torrent mechanism 254 of DIBS 250 can divide the source buffer into blocks based on the number of processes. Each process participating in the torrent can then retrieve and distribute a subset of the blocks to all other processes participating in the torrent using RDMA.

Figure 2B:
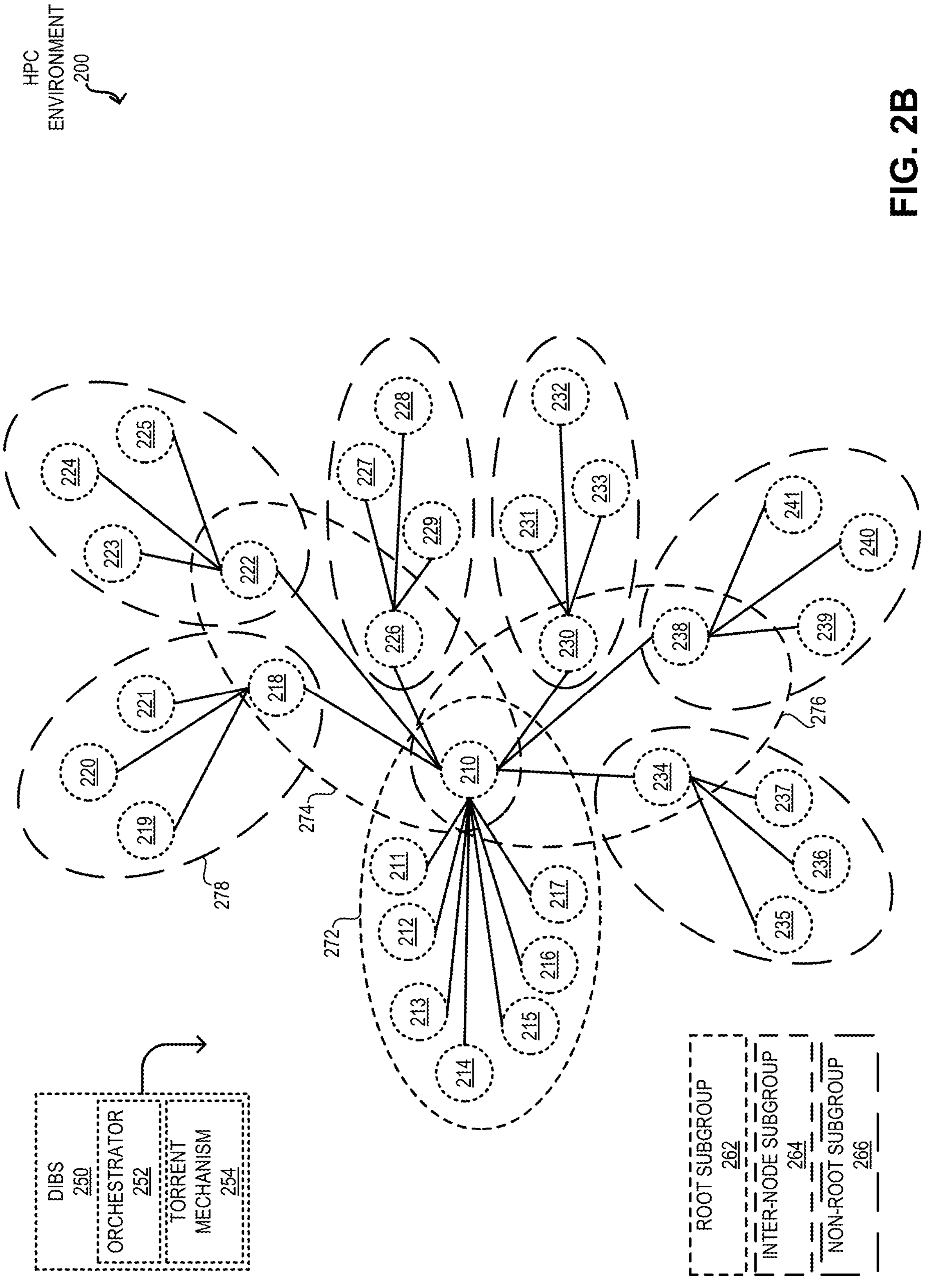
FIG. 2B illustrates an example of distributing segmented data among subgroups of processes executing on a distributed system, in accordance with an aspect of the present application.

FIG. 2B illustrates an example of distributing segmented data among subgroups of processes executing on a distributed system, in accordance with an aspect of the present application. To perform the broadcast operation in HPC environment 200, orchestrator 252 can select root subgroup 262 to execute an initial torrent 272. There may not be a dependency between root subgroup 262 and inter-node subgroup 264. Hence, respective torrents on inter-node subgroup 264 can be initiated in parallel. Since the data transfer in inter-node subgroup 264 is performed via NICs, the number of torrents can correspond to the number of NICs on compute nodes. For example, if a compute node is equipped with at least two NICs, there can be two inter-node torrents 274 and 276. Here, torrent 274 can distribute the data from process 210 to processes 218, 222, and 226; and another torrent 276 can distribute the data from process 210 to processes 230, 234, and 238.

Because process 210 can receive the data in its local destination buffer via torrent 272 in root subgroup 262, torrents 274 and 276 can be non-root torrents. When processes 218, 222, and 226 receive the data via torrent 274, each of these processes can select a subset of processes in non-root subgroup 266 and initiate a torrent to distribute the data. As a result, on a respective compute node, there can be two parallel torrents to distribute the data to the processes of non-root subgroup 266. For example, when process 218 receives the data via torrent 274, orchestrator 254 can initiate another torrent 278 to distribute the data to processes 219, 220, and 221. Because process 218 can receive the data in its local destination buffer via torrent 274 in root subgroup 264, torrent 278 can be a non-root torrent. Similarly, orchestrator 254 can initiate, in parallel, a torrent for distributing the data from each of processes 222, 226, 230, 234, and 238. In this way, DIBS 250 can efficiently broadcast the data among processes distributed across a plurality of computing units of multiple compute nodes.

Figure 3A:
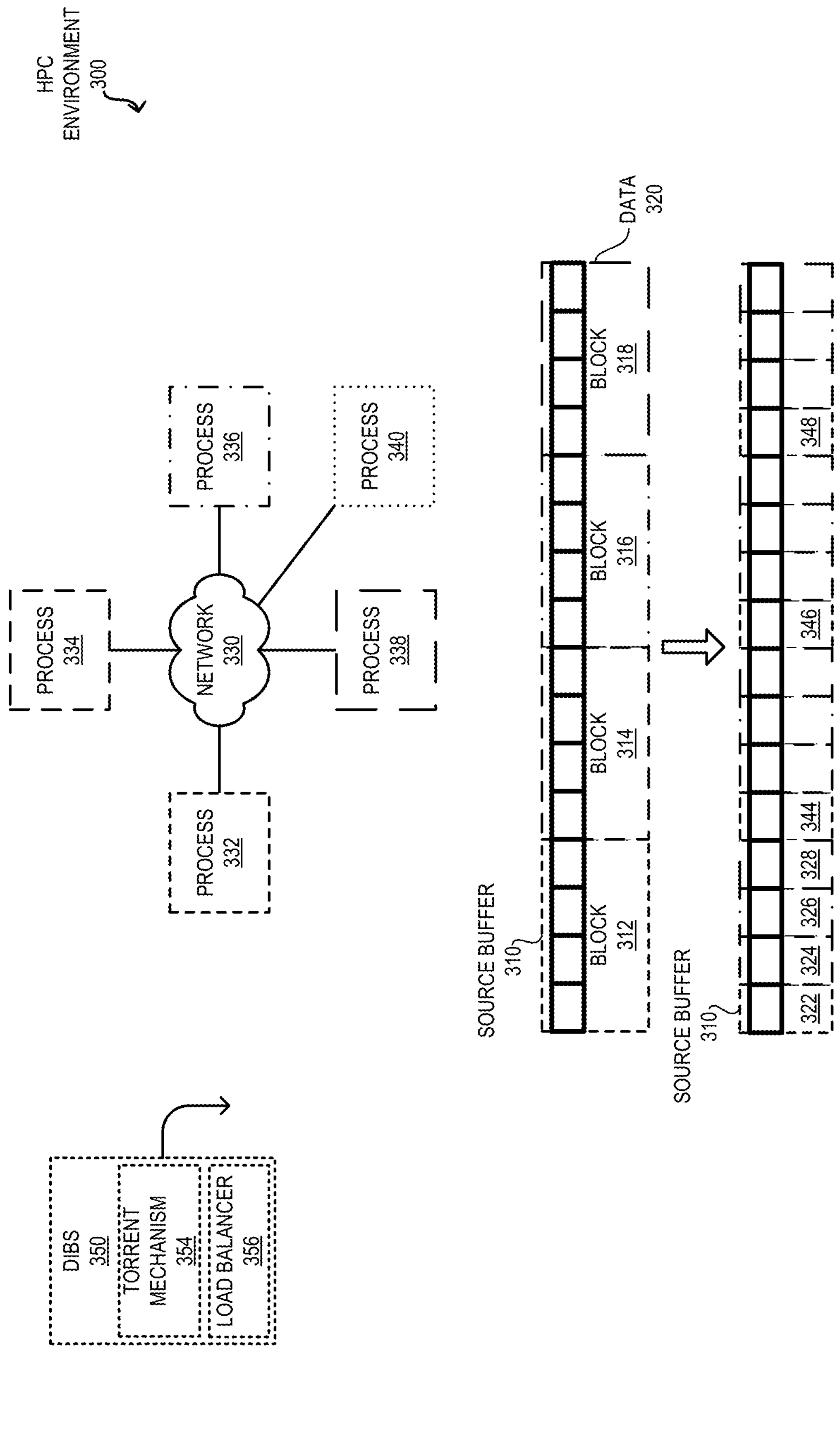
FIG. 3A illustrates an example of multi-level segmentation of data for a distributed inter-process broadcast operation, in accordance with an aspect of the present application.

FIG. 3A illustrates an example of multi-level segmentation of data for a distributed inter-process broadcast operation, in accordance with an aspect of the present application. In HPC environment 300, a number of processes 332, 334, 336, and 338 can be executed on corresponding computing units. Processes 332, 334, 336, and 338 can communicate with each other via a network 330. If two processes execute on the same compute node, the processes can communicate with each other via an intra-node interconnect. On the other hand, if they execute on different compute nodes, they can communicate with each other via an intra-node interconnect as well as inter-node links. Therefore, network 330 can incorporate inter-node links and intra-node interconnects.

Processes 332, 334, 336, and 338 perform a collective computation in conjunction with each other (e.g., by utilizing parallelism). For example, if processes 332, 334, 336, and 338 perform an SPMD computation, these processes can perform a broadcast operation to distribute input or global values of the collective computation. The broadcast operation can include a root process, which can be process 332. Root process 332 can distribute data 320 from a source buffer 310 to respective destination buffers of processes 332, 334, 336, and 338, respectively. Hence, source buffer 310 can store data 320 that is to be distributed by the broadcast operation. HPC environment 300 can deploy DIBS 350 that can achieve low latency with high bandwidth efficiency. Torrent mechanism 354 of DIBS 350 can use torrents to perform the broadcast operation where data 320 is segmented into blocks 312, 314, 316, and 318. Processes 332, 334, 336, and 338 can retrieve blocks 312, 314, 316, and 318, respectively, based on RDMA GET operations. Subsequently, a respective process can distribute the retrieved block to the destination buffers of all other processes based on RDMA PUT operations.

To further enhance the distribution of data 320, load balancer 356 of DIBS 350 can randomly select a target process to send data 320 instead of sequential selection. Such randomization can improve the utilization of network 330. In addition, the volume of data 320 is large, each of blocks 312, 314, 316, and 318 can also be large. To transfer these large blocks, load balancer 356 can perform multi-level segmentation where each block can be divided into smaller sub-blocks. Instead of allocating individual blocks, torrent mechanism 354 can then allocate the sub-blocks to processes 332, 334, 336, and 338 with interleaving. Since there are four processes, a respective block can be further divided into four sub-blocks based on the multi-level segmentation. Torrent mechanism 354 can then initiate torrents for individual sub-blocks. Because a sub-block can be distributed via a torrent, in this example, a sub-block of data 320 can be the segment on which the broadcast operation is being performed.

For example, torrent mechanism 354 can then initiate a torrent for individual block 312 instead of data 320 in its entirety. Block 312 can be divided into sub-blocks 322, 324, 326, and 328. Instead of allocating block 312 to a process, torrent mechanism 354 can allocate sub-blocks 322, 324, 326, and 328 to processes 332, 334, 336, and 338, respectively. In this way, torrent mechanism 354 can allocate every ith sub-block to the ith process. Here, the first sub-block of blocks 312, 314, 316, and 318 can be sub-blocks 322, 344, 346, and 348, respectively. Torrent mechanism 354 can then allocate sub-blocks 322, 344, 346, and 348 to process 332. As a result, process 332 can become responsible for distributing sub-blocks 322, 344, 346, and 348 in an interleaving way using torrent. Since a sub-block includes a fraction of the data of a block, the resources (e.g., bandwidth in network 330) needed to transfer a sub-block can be significantly less.

In addition, some processes, such as process 338, can be responsible for initiating another torrent in another subgroup (e.g., a non-root subgroup), which can include process 340. When process 338 receives sub-blocks 322, 324, 326, and 328 from processes 332, 334, 336, and 338, respectively, process 338 can initiate a torrent for block 312 in the subgroup without waiting for the transfer of subsequent blocks. In this way, load balancer 356 can use multi-level segmentation to facilitate pipelining where subsequent torrents can be initiated when the transfer of individual blocks is complete.

Figure 3B:
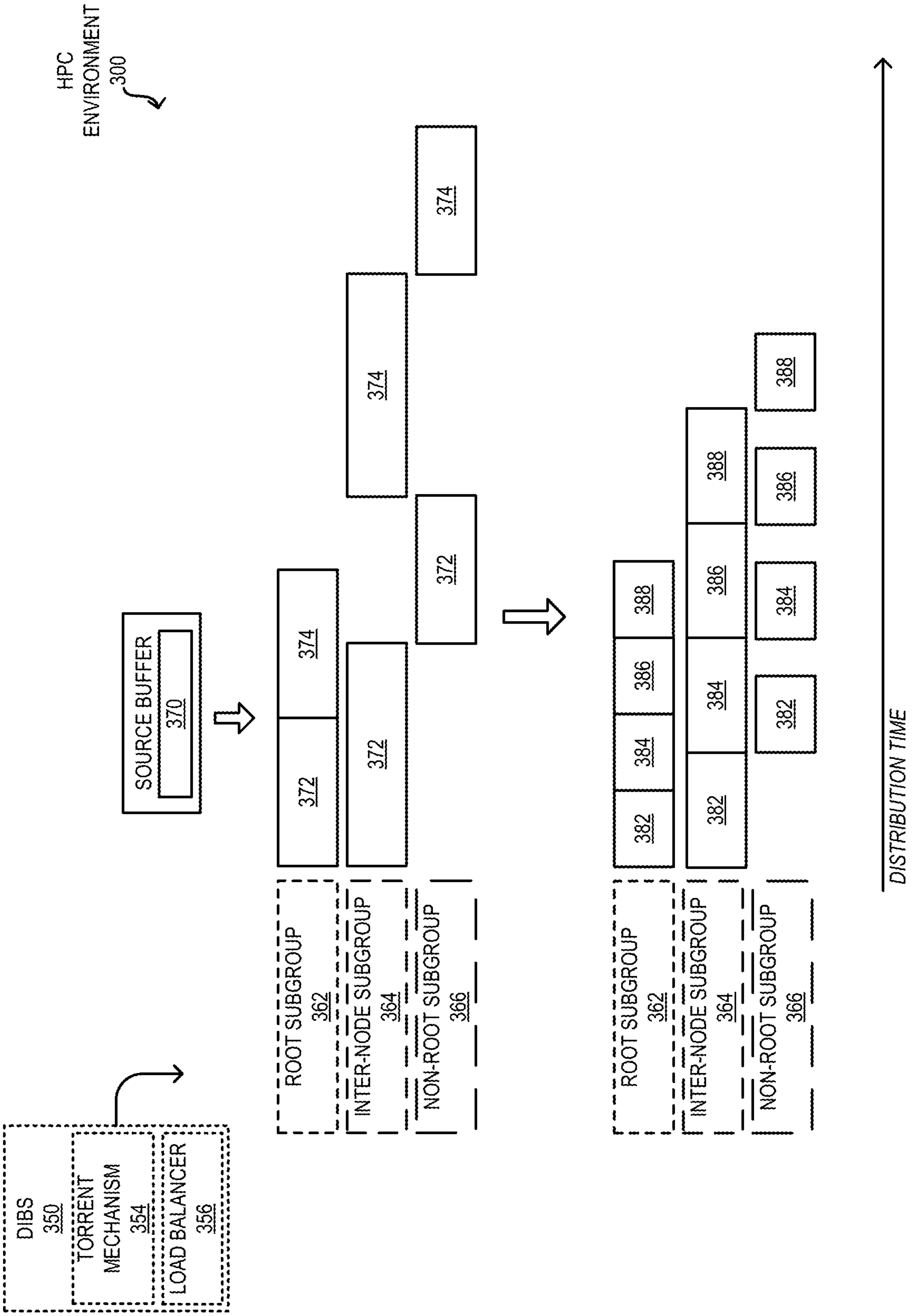
FIG. 3B illustrates an example of pipelining in a distributed inter-process broadcast operation, in accordance with an aspect of the present application.

FIG. 3B illustrates an example of pipelining in a distributed inter-process broadcast operation, in accordance with an aspect of the present application. In this example, torrent mechanism 352 can divide data 370 in a source buffer into a number of blocks 372 and 374. During operation, a torrent can be initiated to distribute block 372 in a root subgroup 362. The distribution of block 372 in inter-node subgroup 364 may not be dependent on its distribution in root subgroup 362. Therefore, another torrent can be initiated to distribute block 372 in an inter-node subgroup 364. Block 372 can be transferred over an interconnect within a compute node while being distributed in subgroup 362. On the other hand, block 372 can be transferred over a network while being distributed in inter-node subgroup 364. Hence, the distribution time for block 372 in inter-node subgroup 364 can be larger than the distribution time in root subgroup 362. Because the distribution of block 372 in non-root subgroup 366 can be dependent on its distribution in inter-node subgroup 364, a torrent in non-root subgroup 366 can be initiated after the distribution of block 372 is complete. This process can be repeated for block 374.

Multi-level segmentation can be utilized to facilitate pipelining to distribute data 370 more efficiently. Torrent mechanism 352 can divide block 372 into sub-blocks 382 and 384, and block 374 into sub-blocks 386 and 388. Sub-block 382 can be distributed in root subgroup 362 and inter-node subgroup 364 via respective torrents in parallel. However, the distribution of sub-block 382 has interdependency between non-root subgroup 366 and inter-node subgroup 364. Hence, when the distribution of sub-block 382 is complete in inter-node subgroup 364, a torrent in non-root subgroup 366 can be initiated for sub-block 382. When sub-block 382 is received in root subgroup 362 and inter-node subgroup 364, a torrent for sub-block 384 can be initiated in these subgroups. Therefore, sub-blocks 382 and 384 can be distributed in different subgroups in a pipeline. This pipelined distribution technique can be repeated for sub-blocks 386 and 388 as well. In this way, DIBS 350 can efficiently distribute individual sub-blocks in a pipeline among different subgroups.

Figure 4A:
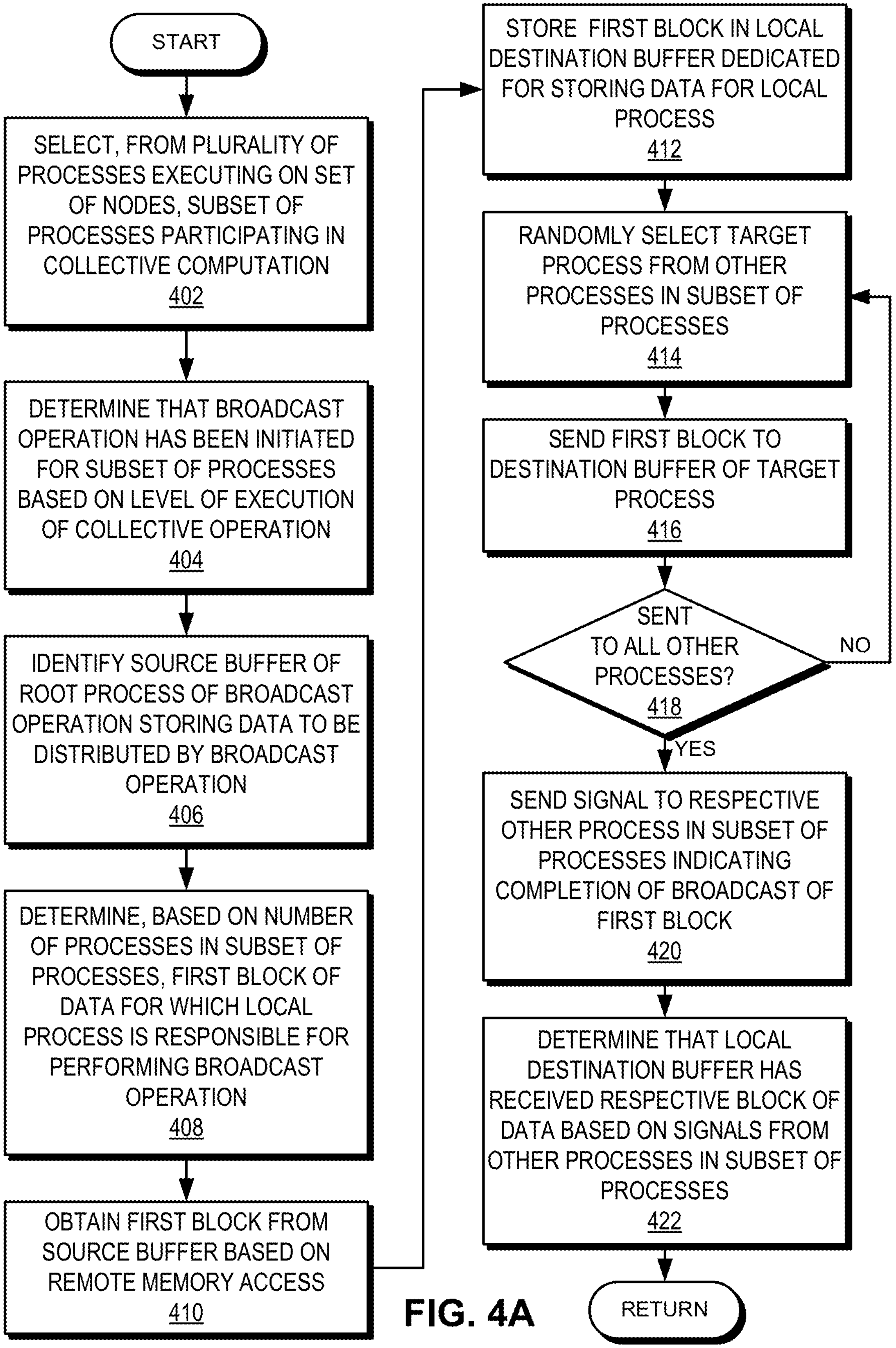
FIG. 4A presents a flowchart illustrating an example of a process executing on a node performing a distributed inter-process broadcast operation, in accordance with an aspect of the present application.

FIG. 4A presents a flowchart illustrating an example of a process executing on a node performing a distributed inter-process broadcast operation, in accordance with an aspect of the present application. During operation, the process can select, from a plurality of processes executing on a set of nodes, a subset of processes participating in a collective computation (operation 402). The computation can be performed by the subset of processes. For example, if the processes perform an SPMD computation, the subset of processes can perform a broadcast operation to distribute input or global values of the collective computation. Accordingly, the process can determine that the broadcast operation has been initiated for the subset of processes based on a level of execution of the collective computation (operation 404). Typically, when the process needs to perform a broadcast operation, a function call facilitated by the underlying programming model is executed. The execution of the function call can trigger the broadcast operation. Therefore, when the function call is executed by the underlying programming model, the process can determine the initiation of the broadcast operation.

The process can then identify a source buffer of a root process of the broadcast operation storing the data to be distributed by the broadcast operation (operation 406). Here, the root process can be the process from which all processes of the subset of processes can obtain the data. The data can be stored in a source buffer of the root process. Based on the broadcast operation semantics of the underlying programming model, a respective process can identify the root process and a respective other process participating in the broadcast operation and discover the total volume (or size) of the data in the source buffer that is to be broadcast. Accordingly, the process can determine, based on the number of processes in the subset of processes, a first block of the data for which the local process is responsible for performing a broadcast operation (operation 408). The local process can be the process being executed.

The process can then obtain the first block from the source buffer based on remote memory access (operation 410). For example, the process can issue an RDMA GET operation to obtain the first block. The location of the source buffer is facilitated by the underlying programming model of the process. The process can store the first block in a local destination buffer dedicated for storing the data for the local process (operation 412). In other words, the first block can be transferred from the source buffer to the local destination buffer. When the first block becomes available in the local destination buffer, the process can start distributing the first block to all other processes in the subset of processes.

To distribute the first block, the process can then randomly select a target process of the other processes in the subset of processes (operation 414) and send the first block to the destination buffer of the target process (operation 416). The process can use a random number generator that can randomly generate an integer that can be used as an index to select the target process from the processes participating in the broadcast operation. Upon selecting the target process, the process can perform an RDMA PUT operation to transfer the first block from the local destination buffer to the corresponding location of the destination buffer of the target process. The process can then determine whether the first block is sent to all other processes in the subset of processes (operation 418). If the RDMA PUT operation to transfer the first block is successful for the respective destination buffers of all target processes, the process can determine that the first block is sent to all other processes. If the first block is not sent to all other processes, the process can continue to randomly select another target process (operation 414).

On the other hand, if the first block is sent to all other processes, the process can send a signal to a respective other process in the subset of processes indicating the completion of the transfer of the first block (operation 420). A respective process can independently and asynchronously distribute a block allocated to that process. When the process completes the distribution of the block, other processes can also the distribution of corresponding blocks and send respective signals indicating the completion of the transfer of the corresponding block. When the signals are received from all other processes, all blocks of the data can be present in the local destination buffer. Therefore, the process can determine that the local destination buffer has received a respective block of the data based on respective signals from the other processes in the subset of processes (operation 422).

Figure 4B:
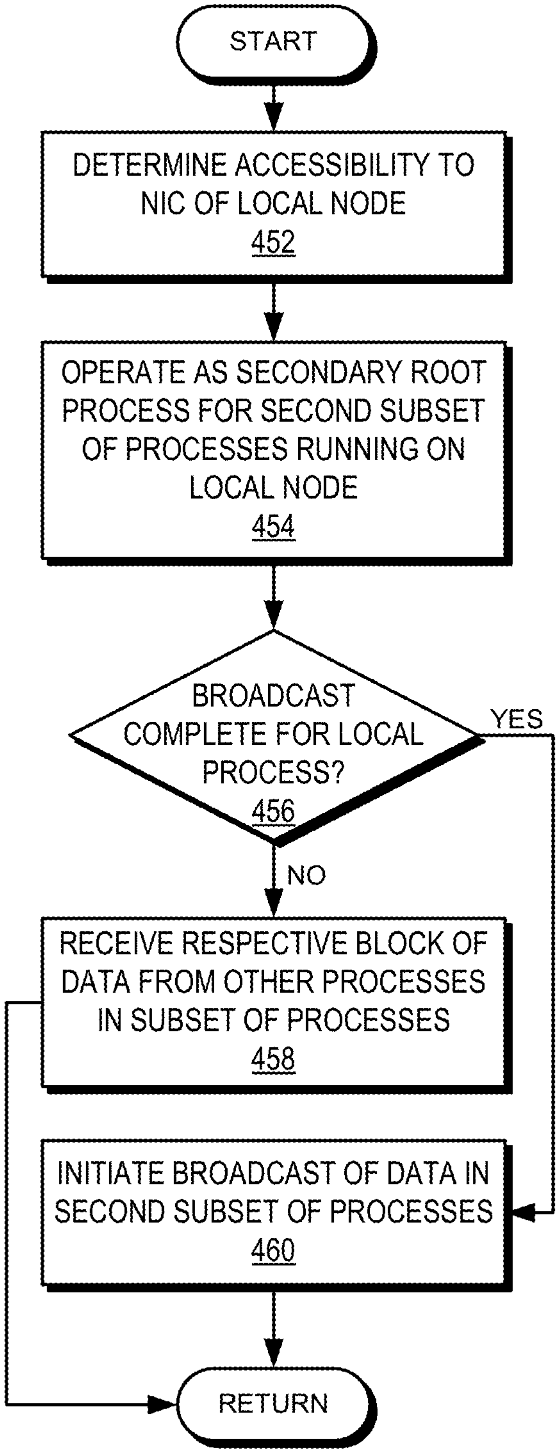
FIG. 4B presents a flowchart illustrating an example of a process executing on a node performing a distributed inter-process broadcast operation among different subgroups, in accordance with an aspect of the present application.

FIG. 4B presents a flowchart illustrating an example of a process executing on a node performing a distributed inter-process broadcast operation among different subgroups, in accordance with an aspect of the present application. During operation, the process can determine the accessibility to the NIC of the local node (operation 452). Within the local node, the computing unit that is physically closest to the NIC can have the most accessibility. The process can identify the computing unit it is executing on (e.g., using a system call). If the process is executed on that computing unit, the process can have the most accessibility among all processes. Hence, the process can operate as a secondary root process for a second subset of processes executing on the local node (operation 454). The second subset of processes can be the processes in a non-root subgroup.

The process can then determine whether the broadcast operation is complete for the local process (operation 456). When all blocks of the data are present in the local destination buffer, the broadcast operation can be complete for the local process. The completion of the broadcast operation allows the process to initiate the broadcast of the data in the second subset of processes (e.g., in the non-root subgroup) (operation 460). On the other hand, if the broadcast operation is not complete for the local process, some of the blocks are yet to be received by the process. The process can then receive a respective block of the data from other processes in the subset of processes (operation 458).

Figure 5:
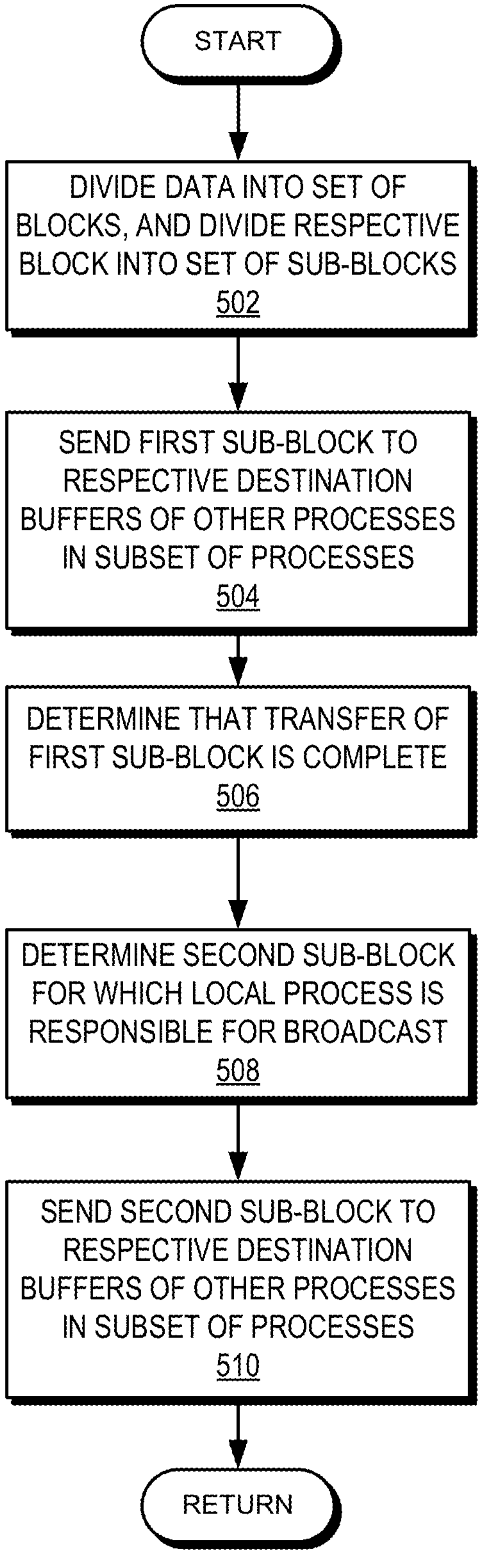
FIG. 5 presents a flowchart illustrating an example of a process executing on a node performing a distributed inter-process broadcast operation based on multi-level segmentation of data, in accordance with an aspect of the present application.

FIG. 5 presents a flowchart illustrating an example of a process executing on a node performing a distributed inter-process broadcast operation based on multi-level segmentation of data, in accordance with an aspect of the present application. During operation, the process can divide the data into a set of blocks, and divide a respective block into a set of sub-blocks (operation 502). In this way, the process can facilitate multi-level segmentation of the data. Dividing the data into smaller sub-blocks can allow the process to pipeline the transfer of sub-blocks. Accordingly, the process send a first sub-block to respective destination buffers of other processes in the subset of processes (operation 504). The process can execute respective RDMA PUT commands to send the first sub-block.

Subsequently, the process can determine that the transfer of the first block is complete (operation 506). When the process sends the first sub-block to all other processes, the transfer of the first sub-block can be complete. When the RDMA PUT operation is successfully executed for the first sub-block for a respective other process, the process can determine that the transfer of the first sub-block can be complete. The process can then determine a second sub-block for which the local process is responsible for broadcast (operation 508). For example, if the process is responsible for broadcasting the ith sub-block in a respective block, the first sub-block can be the ith sub-block in the first block, and the second sub-block can be the ith sub-block in the second block. In this way, the process can continue to send every ith sub-block until all blocks are distributed. If pipelining is supported by the process, the process can start sending the second sub-block while the first sub-block can be distributed in another set of processes. Hence, the process can send the second sub-block to respective destination buffers of other processes in the subset of processes (operation 510). In this way, the process can efficiently distribute the sub-blocks using a pipeline.

Figure 6:
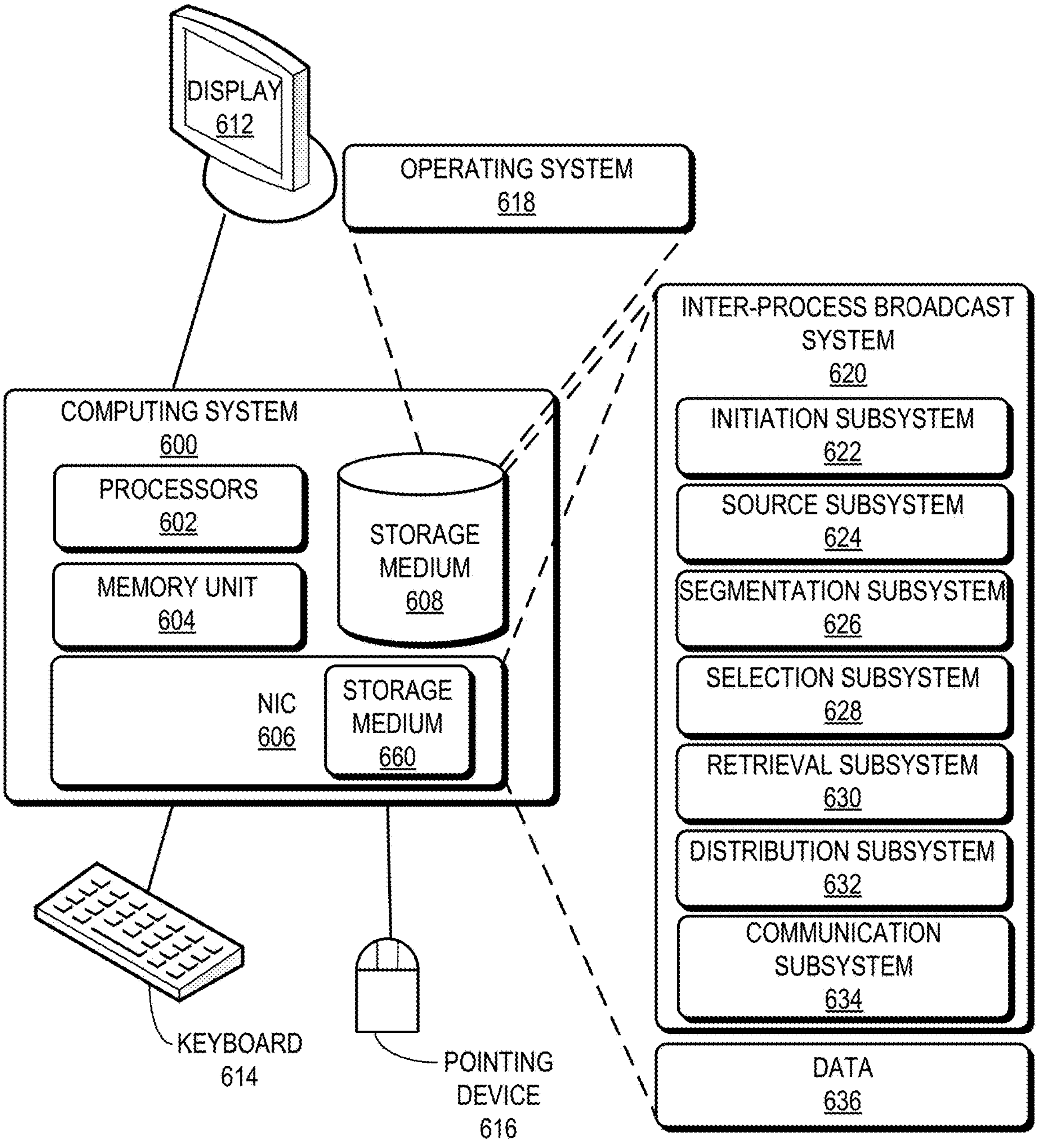
FIG. 6 illustrates an example of a computing system supporting efficient inter-process broadcast, in accordance with an aspect of the present application.

FIG. 6 illustrates an example of a computing system supporting efficient inter-process broadcast, in accordance with an aspect of the present application. A computing system 600 can include a set of processors 602, a memory unit 604, a NIC 606, and a storage medium 608. NIC 606 can include another storage medium 660. Memory unit 604 can include a set of volatile memory devices (e.g., dual in-line memory module (DIMM)). Furthermore, computing system 600 may be coupled to a display device 612, a keyboard 614, and a pointing device 616, if needed. Storage medium 608 can store an operating system 618. An inter-process broadcast system 620 and data 636 associated with inter-process broadcast system 620 can be maintained and executed from storage medium 608 and/or NIC 606.

Inter-process broadcast system 620 can include instructions, which when executed by computing system 600, can cause computing system 600 (or NIC 606) to perform methods and/or processes described in this disclosure. Inter-process broadcast system 620 can include instructions for determining a subset of processes for which data from a source buffer is to be broadcast (initiation subsystem 622), as described in conjunction with operation 402 in FIG. 4A.

Inter-process broadcast system 620 can also include instructions for determining that a broadcast operation has been initiated for the subset of processes based on a level of execution of the collective operation (initiation subsystem 622), as described in conjunction with operation 404 in FIG. 4A.

Inter-process broadcast system 620 can then include instructions for identifying a source buffer of the data on which the broadcast operation is to be performed (source subsystem 624), as described in conjunction with operation 406 in FIG. 4A. Furthermore, inter-process broadcast system 620 can include instructions for segmenting the data into a set of blocks based on the number of processes in the subset of processes (segmentation subsystem 626), as described in conjunction with FIG. 1B. Inter-process broadcast system 620 can include instructions for performing multi-level segmentation on the data (segmentation subsystem 626), as described in conjunction with FIGS. 3A and 5. Moreover, inter-process broadcast system 620 can also include instructions for determining the blocks for which a local process is responsible for distribution (selection subsystem 628), as described in conjunction with operation 408 in FIG. 4A.

Inter-process broadcast system 620 can then include instructions for retrieving the blocks from the source buffer (e.g., based on an RDMA GET command) to a local destination buffer (retrieval subsystem 630), as described in conjunction with operation 410 in FIG. 4A. In addition, inter-process broadcast system 620 can include instructions for distributing the blocks from the local destination buffer to the destination buffers of other processes (e.g., based on an RDMA PUT command) (distribution subsystem 630), as described in conjunction with operations 414, 416, and 418 in FIG. 4A. Inter-process broadcast system 620 may further include instructions for sending and receiving data associated with the computations performed by the processes (communication subsystem 634), as described in conjunction with operations 410 and 416 in FIG. 4A. Data 636 can include any data that can facilitate the operations of inter-process broadcast system 620. Data 636 can include, but is not limited to, data generated by the source and destination buffers.

Figure 7:
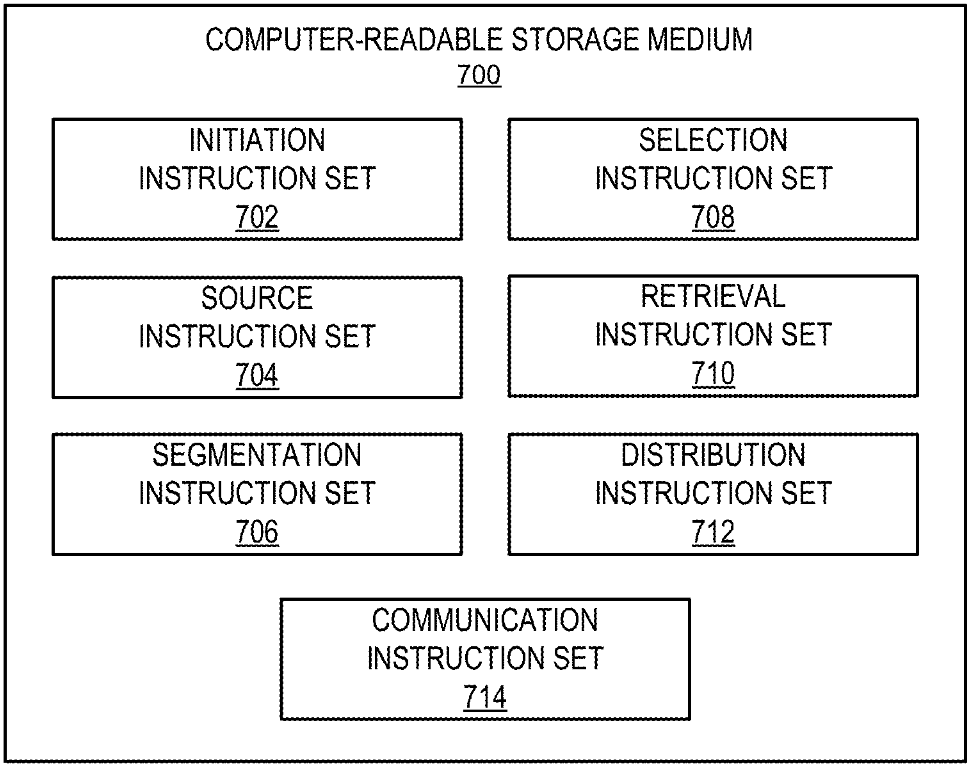
FIG. 7 illustrates an example of a computer-readable storage medium that facilitates efficient inter-process broadcast, in accordance with an aspect of the present application.

FIG. 7 illustrates an example of a computer-readable storage medium that facilitates efficient inter-process broadcast, in accordance with an aspect of the present application. Computer-readable storage medium 700 can comprise one or more integrated circuits, and may store fewer or more instruction sets than those shown in FIG. 7. Further, storage medium 700 may be integrated with a computer system, or integrated in a device that is capable of communicating with other computer systems and/or devices. For example, storage medium 700 can be in the NIC of a computer system.

Storage medium 700 can comprise instruction sets 702-714, which when executed, can perform functions or operations similar to subsystems 622-634, respectively, of inter-process broadcast system 620 of FIG. 6. Here, storage medium 700 can include an initiation instruction set 702; a source instruction set 704, a segmentation instruction set 706; a selection instruction set 708; a retrieval execution instruction set 710; a distribution instruction set 712; and a communication instruction set 714.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a system for performing a broadcast operation on a first process in a plurality of processes executing a collective computation on a set of nodes. During operation, the system can select, from the plurality of processes, a subset of processes based on a plurality of selection conditions. The system can initiate a broadcast operation for the subset of processes and identify a source buffer of a root process storing data to be distributed by the broadcast operation. The system can then determine a first segment of the data for which the first process is responsible for broadcasting based on a number of processes in the subset of processes. Subsequently, the system can obtain the first segment from the source buffer based on a first remote memory access command and store the first segment in a first destination buffer dedicated to storing the data for the first process. The system can send the first segment to the respective destination buffers of other processes in the subset of processes based on a second remote memory access command. These operations of the system are described in conjunction with FIG. 4A.

In a variation on this aspect, the plurality of selection conditions can include one or more of: a location of a respective process with respect to the root process, accessibility to a network interface controller (NIC) of the computer system, and distribution of processes on individual nodes. These features of the system are described in conjunction with FIG. 2A.

In a further variation, the subset of processes can include one of: (i) a first subset of processes running on a node that executes the root process, (ii) a second subset of processes with accessibility to respective NICs of one or more nodes, and (iii) a third subset of processes running on a node that executes at least one process in the second subset of processes. Here, the at least one process can operate as a secondary root process for the third subset of processes. These features of the system are described in conjunction with FIG. 2B.

In a further variation, the first process can be the secondary root process. The system can then determine whether the broadcast of the data in the second subset of processes is complete. If the broadcast of the data in the second subset of processes is complete, the system can initiate a broadcast of the data in the third subset of processes. The first destination buffer can operate as a secondary source buffer. These operations of the system are described in conjunction with FIG. 4B.

In a further variation, the first process does not participate in the broadcast of the data in the third subset of processes. These features of the system are described in conjunction with FIG. 1D.

In a variation on this aspect, the system can send a signal to a respective other process in the subset of processes indicating completion of the broadcast of the first block. The system can also determine that the first destination buffer has received a respective segment of the data based on respective signals from other processes in the subset of processes. These operations of the system are described in conjunction with FIG. 4A.

In a variation on this aspect, to send the first segment to the respective destination buffers of the other processes, the system can randomly select a target process from the subset of processes and send the first segment to a destination buffer of the target process. These operations of the system are described in conjunction with FIG. 4A.

In a variation on this aspect, the system can divide the data into a set of blocks. The system can further divide a respective block into a set of sub-blocks. The first segment can then be a sub-block in a first block. These operations of the system are described in conjunction with FIG. 5.

In a further variation, the system can determine that the broadcast of the first block is complete. The system can then determine a second segment of the data for which the first process is responsible for broadcasting. Here, the second segment is a sub-block in a second block. Subsequently, the system can send the second segment to the respective destination buffers of other processes in the subset of processes. These operations of the system are described in conjunction with FIG. 5.

In this disclosure, the term "switch" is used in a generic sense, and it can refer to any standalone network device or fabric device operating in any network layer. "Switch" should not be interpreted as limiting examples of the present invention to layer-2 networks. Any device that can forward traffic to an external device or another switch can be referred to as a "switch." If the switch can be virtualized as well.

Furthermore, if a network device facilitates communication between networks, the network device can be referred to as a gateway device. Any physical or virtual device (e.g., a virtual machine or switch operating on a computing device) that can forward traffic to an end device can be referred to as a "network device." Examples of a "network device" include, but are not limited to, a layer-2 switch, a layer-3 router, a routing switch, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

The data structures and code described in this detailed description are typically stored on a computer-readable storage medium, which may be any device or medium that can store code and/or data for use by a computer system. The computer-readable storage medium can include, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and codes and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block, a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer system, comprising:
- a processor; and
- a non-transitory machine-readable medium comprising instructions executable by the processor to execute a first process of a collective computation executing on a plurality of processes on a set of nodes, which includes the computer system;

wherein executing the first process comprises:
- selecting a subset of processes as participants of a torrent operation based on a plurality of selection conditions;
- initiating the torrent operation involving the subset of processes;
- identifying a source buffer of a root process storing data to be distributed by the torrent operation;
- dividing the data into a plurality of segments based on a number of processes in the subset of processes, a respective process being responsible for distributing one or more corresponding segments to the subset of processes;
- determining, from the plurality of segments, a first segment for which the first process is responsible for distributing based on an index of the first process;
- obtaining the first segment from the source buffer based on remote memory access;
- storing the first segment in a first destination buffer dedicated to storing the data for the first process; and
- sending the first segment to respective destination buffers of other processes in the subset of processes.

2. The computer system of claim 1, wherein the plurality of selection conditions comprises one or more of: a location of a respective process with respect to the root process, accessibility to a network interface controller (NIC) of the computer system, and distribution of processes on individual nodes.

3. The computer system of claim 2, wherein the subset of processes comprises one of:
- a first subset of processes running on a node that executes the root process;
- a second subset of processes with accessibility to respective NICs of one or more nodes; and
- a third subset of processes running on a node that executes at least one process in the second subset of processes, wherein the at least one process operates as a secondary root process for the third subset of processes.

4. The computer system of claim 3, wherein the first process is the secondary root process; and wherein executing the first process further comprises:
- determining whether the torrent operation in the second subset of processes is complete; and
- in response to the torrent operation in the second subset of processes being complete, initiating a torrent operation in the third subset of processes, wherein the first destination buffer operates as a secondary source buffer.

5. The computer system of claim 4, wherein the first process does not participate in the torrent operation in the third subset of processes.

6. The computer system of claim 1, wherein executing the first process further comprises:

sending a signal to a respective other process in the subset of processes indicating completion of the distribution of the first segment; and determining that the first destination buffer has received a respective segment of the data based on respective signals from other processes in the subset of processes.

7. The computer system of claim 1, wherein sending the first segment to respective destination buffers of the other processes further comprises:

randomly selecting a target process from the subset of processes; and sending the first segment to a destination buffer of the target process.

8. The computer system of claim 1, wherein executing the first process further comprises:

dividing the data into a set of blocks; and dividing a respective block into a set of sub-blocks, wherein the first segment is a sub-block in a first block.

9. The computer system of claim 8, wherein executing the first process further comprises:

determining that the distribution of the first block is complete;

determining a second segment of the data for which the first process is responsible for distributing, wherein the second segment is a sub-block in a second block; and sending the second segment to respective destination buffers of other processes in the subset of processes.

10. A method, comprising:

selecting, by a first process of a collective computation executing on a plurality of processes on a set of nodes, a subset of processes as participants of a torrent operation based on a plurality of selection conditions;

initiating the torrent operation involving the subset of processes;

identifying a source buffer of a root process storing data to be distributed by the torrent operation;

dividing the data into a plurality of segments based on a number of processes in the subset of processes, a respective process being responsible for distributing one or more corresponding segments to the subset of processes;

determining a first segment of the data for which the first process is responsible for distributing based on an index of the first process;

obtaining the first segment from the source buffer based on a first remote memory access command;

storing the first segment in a first destination buffer dedicated to storing the data for the first process; and sending the first segment to respective destination buffers of other processes in the subset of processes based on a second remote memory access command.

11. The method of claim 10, wherein the plurality of selection conditions comprises one or more of: a location of a respective process with respect to the root process, accessibility to a network interface controller (NIC) of the computer system, and distribution of processes on individual nodes.

12. The method of claim 11, wherein the subset of processes comprises one of:

a first subset of processes running on a node that executes the root process;

a second subset of processes with accessibility to respective NICs of one or more nodes; and a third subset of processes running on a node that executes at least one process in the second subset of processes, wherein the at least one process operates as a secondary root process for the third subset of processes.

13. The method of claim 12, wherein the first process is the secondary root process; and wherein the method further comprises:

determining whether the torrent operation in the second subset of processes is complete; and in response to the torrent operation in the second subset of processes being complete, initiating a torrent operation in the third subset of processes, wherein the first destination buffer operates as a secondary source buffer.

14. The method of claim 13, wherein the first process does not participate in the torrent operation in the third subset of processes.

15. The method of claim 10, further comprising:

sending a signal to a respective other process in the subset of processes indicating completion of the distribution of the first segment; and determining that the first destination buffer has received a respective segment of the data based on respective signals from other processes in the subset of processes.

16. The method of claim 10, wherein sending the first segment to respective destination buffers of the other processes further comprises:

randomly selecting a target process from the subset of processes; and sending the first segment to a destination buffer of the target process.

17. The method of claim 10, further comprising:

dividing the data into a set of blocks; and dividing a respective block into a set of sub-blocks, wherein the first segment is a sub-block in a first block.

18. The method of claim 17, further comprising:

determining that the distribution of the first block is complete;

determining a second segment of the data for which the first process is responsible for distributing, wherein the second segment is a sub-block in a second block; and sending the second segment to respective destination buffers of other processes in the subset of processes.

19. A non-transitory computer-readable storage medium comprising instructions which, when executed by a processor of a computing system cause the computer system to:

execute a first process in a plurality of processes executing a collective computation on a set of nodes;

select, from the plurality of processes, a subset of processes as participants of a torrent operation based on a plurality of selection conditions;

initiate the torrent operation involving the subset of processes;

identify a source buffer of a root process storing data to be distributed by the torrent operation;

dividing the data into a plurality of segments based on a number of processes in the subset of processes, a respective process being responsible for distributing one or more corresponding segments to the subset of processes;

determine a first segment of the data for which the first process is responsible for distributing based on an index of the first process;

obtain the first segment from the source buffer based on remote memory access;

store the first segment in a first destination buffer dedicated to storing the data for the first process;

send the first segment to respective destination buffers of other processes in the subset of processes; and send a signal to a respective other process in the subset of processes indicating completion of the broadcast of the first segment.

20. The non-transitory computer-readable storage medium of claim 19, wherein the instructions which, when executed by the processor, cause the computer system further to:

divide the data into a set of blocks;

divide a respective block into a set of sub-blocks, wherein the first segment is a sub-block in a first block;

determine that the distribution of the first block is complete; and send a second segment to respective destination buffers of other processes in the subset of processes, wherein the second segment is a sub-block in a second block.

* * * * *